United States Patent
Finetti et al.

(10) Patent No.: US 7,493,930 B2
(45) Date of Patent: Feb. 24, 2009

(54) APPARATUS FOR FORMING AT LEAST ONE CONTINUOUS STRIP OF CONTAINERS

(75) Inventors: Primo Finetti, Mirandola (IT); Andrea Bartoli, Reggio Emilia (IT)

(73) Assignee: Sarong Societa' per Azioni, Reggiolo (IT)

( * ) Notice: Subject to any disclaimer, the term of this patent is extended or adjusted under 35 U.S.C. 154(b) by 0 days.

(21) Appl. No.: 10/502,637

(22) PCT Filed: Jan. 23, 2003

(86) PCT No.: PCT/IB03/00163

§ 371 (c)(1),
(2), (4) Date: Oct. 12, 2004

(87) PCT Pub. No.: WO03/061946

PCT Pub. Date: Jul. 31, 2003

(65) Prior Publication Data

US 2005/0034817 A1    Feb. 17, 2005

(30) Foreign Application Priority Data

Jan. 24, 2002   (IT) .......................... MO2002A0017

(51) Int. Cl.
*B29C 49/00* (2006.01)

(52) U.S. Cl. .................. 156/381; 156/465; 156/498; 156/500; 156/382; 425/438; 425/439; 425/523; 425/535

(58) Field of Classification Search .................. 156/381, 156/465, 498, 500, 382; 425/523, 535, 438, 425/439; 364/210.1, 210.7
See application file for complete search history.

(56) References Cited

U.S. PATENT DOCUMENTS

| 3,092,940 A |   | 6/1963 | David |
| 5,223,073 A | * | 6/1993 | Freddi et al. ................ 156/381 |
| 5,770,003 A | * | 6/1998 | Tabaroni et al. ............. 156/382 |

FOREIGN PATENT DOCUMENTS

| EP | 0479 152 A | 4/1992 |
| EP | 0 692 428 A | 1/1996 |
| WO | 94/08852 A | 4/1994 |

* cited by examiner

*Primary Examiner*—George R Koch, III
(74) *Attorney, Agent, or Firm*—Nixon & Vanderhye P.C.

(57) ABSTRACT

A forming apparatus for forming at least one continuous strip of containers comprises a feed line for the indexing along a preset route according to an advancing direction and with a preset advancing step two continuous webs in film material that face each other. The webs pass through a heat-sealing station provided with a separator the end of which is arranged to be inserted between two open longitudinal flaps of the webs. During the phase of heat-sealing of the webs the separator is kept in position to exert downward pressure against said flaps by means of an axial fluid actuator. The invention ensures that at the forming station, that is contiguous with and subsequent to the heat-sealing station the flaps are sufficiently separated to receive the nozzles that blow in the forming fluid.

9 Claims, 1 Drawing Sheet

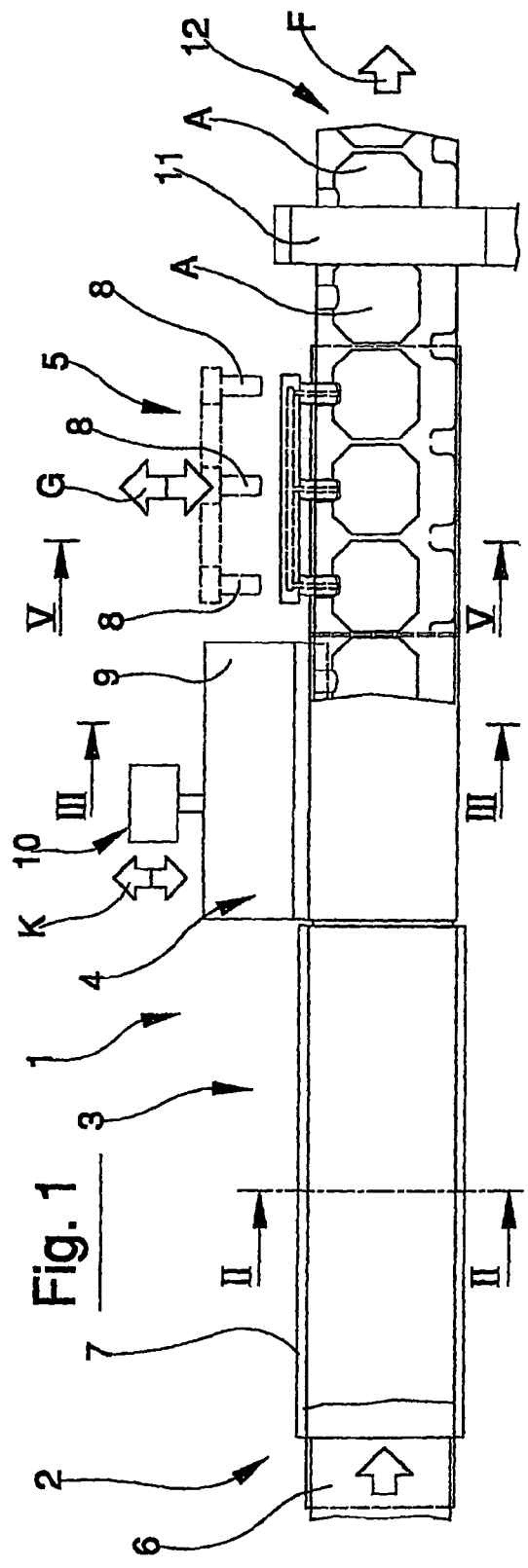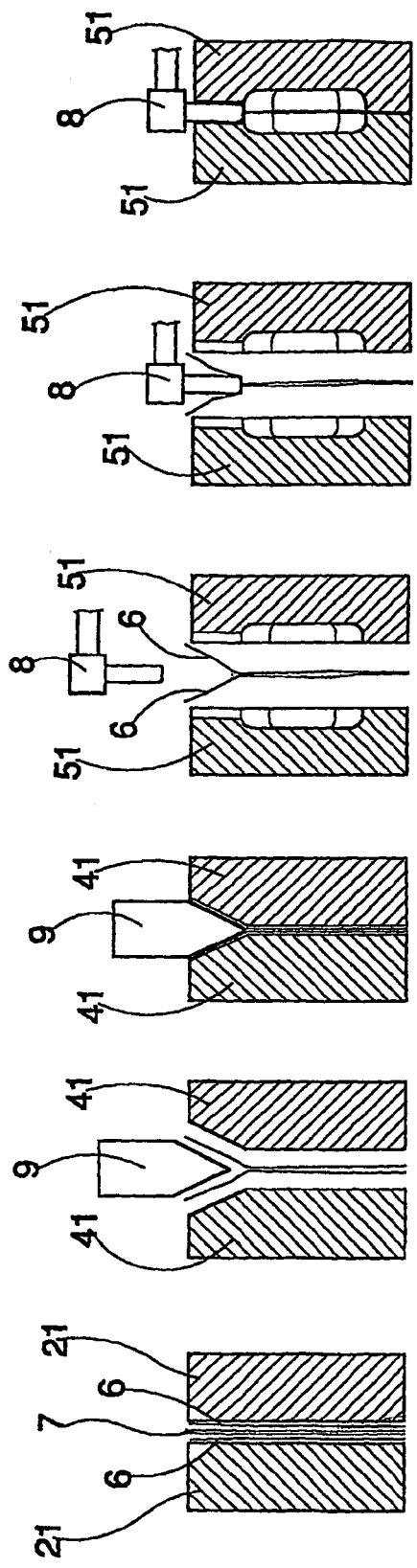

APPARATUS FOR FORMING AT LEAST ONE CONTINUOUS STRIP OF CONTAINERS

This application is the US national phase of international application PCT/IB03/00163 filed 23 Jan. 2003, which designated the US and claims priority to IT Application No. MO2002A000017 filed 24 Jan. 2002. The entire contents of these applications are incorporated herein by reference.

The object of this invention is a forming apparatus for forming at least one continuous strip of containers. Specifically, but not exclusively, this invention can be used to form one or more continuous strips of containers made of heat-sealable and thermoformable plastic material.

It is already known, forming continuous strips of indexing containers by indexing two webs, made of heat-sealable and thermoformable film material that face each other, trough a series of operating stations which transform the webs into at least one strip of containers. The operating stations may comprise, for example, one or more preheating stations for the webs facing one another, a heat-sealing station in which the webs are heat-sealed in preset zones in order to obtain alveoli provided with a mouth, a thermoforming station wherein the alveoli are expanded within suitable forming cavities by injecting a forming fluid into the alveoli through the mouths. Patent IT 1243064 shows an example of a method of this kind.

The main object of this invention is to create a highly reliable and productive apparatus for the production of containers arranged in a continuous strip.

An advantage of the invention is that it provides a constructionally simple and cheap apparatus.

Another advantage is to ensure the operation of the blowing nozzles prearranged to inject the forming fluid in such a way as to expand the film material inside the forming cavities.

These objects and advantages and yet others are all achieved by this invention, as it is shown by the claims set out below.

Further features and advantages of the present invention will better appear from the following detailed description of an embodiment of the invention in subject, illustrated, by way of example that do not limit the scope of the invention, in the accompanying figures.

FIG. 1 is a side view, with a vertical elevation, of a section of an apparatus made according to this invention.

FIG. 2 is the section II-II of FIG. 1.

FIG. 3 is the section III-III of FIG. 1.

FIG. 4 is the section of FIG. 3 with the heat-sealing station in a different operating configuration.

FIG. 5 is the section V-V of FIG. 1.

FIGS. 6 and 7 show the section of FIG. 5 with the forming station in two different operating configurations.

With reference to the abovementioned figures, 12 indicates a continuous strip of containers in which the strip has a preset width and an undefined length and in which the containers A are arranged in a row that extends along the longitudinal axis of the strip.

The strip 12 is formed of one or two continuous webs of film material. In the case in point the use of two distinct webs 6 in heat-sealable and thermoformable plastic material is provided for. In other cases, it is possible to provide, for example, that the two facing webs, with which the various operating stations are fed, are made from a single web having double width folded into a "V" shape.

The two webs 6, unwound from reels, are fed (using a prior-art advancing arrangement, for example an advancing gripper 11) facing each other, with intermittent forward advancing, with a preset constant advancing step, in an advancing direction F, which could be horizontal, which could be horizontal, along a feed line that crosses various operating stations that transform the webs into the continuous strip 12 of containers A. The operating stations in the case in point comprise at least: one or more preheating stations 2 and 3 (two in the described case) in which the webs 6 are prepared for the subsequent and immediately contiguous heat-sealing station 4 in which the preheated webs are heat-sealed in preset zones to obtain alveoli each one provided with a mouth; the next, immediately contiguous, station is a forming station 5 in which the alveoli are expanded within forming cavities by blowing a forming fluid injected through the mouths.

The preheating stations 2 and 3, the heat-sealing station 4 and the forming station 5 each comprise a pair of opposed elements (half moulds) which, through the command of a moving device of the prior-art, open and close in a manner that is coordinated with the step advancing of the webs 6 to perform the above operations on the webs.

21 are the preheating half moulds. 7 is a guard barrier that separates one web from the other at the preheating stations 2 and 3. The barrier is, for example, a continuous vertical solid wall arranged between the two webs 6.

As mentioned, the heat-sealing station 4 comprises two heat-sealing half moulds 41 that face each other from opposite parts in relation to the advancing route of the webs. Said half moulds 41 are prearranged to heat-seal together the two webs 6 to define a row of alveoli. Each alveolus is opened by a side in the direction of a respective longitudinal edge of the webs, towards the top edge in the case in point.

At the heat-sealing station 4 at least one separator 9 is prearranged that could be inserted and engages between the two open flaps that are located on the open (top) longitudinal edge of the webs. The separator 9 extends lengthways (in the advancing direction F of the webs 6) for at least most of the length of the heat-sealing station 4. In the case in point the separator 9 extends substantially over the entire length of the heat-sealing station 4. The separator 9 has a (bottom) wedge-shaped end that is inserted between the two open flaps at the heat-sealing station. This wedge-shaped end extends lengthways over the entire length of the separator or at least most of it.

The heat-sealing half moulds 41 have two opposed grooves at the separator 9 to house the end of the separator 9 that protrudes inside said half moulds.

The separator 9 can be provided with a front tapered end that is wedge-shaped, arranged at the front to facilitate the initial insertion of the separator between the open flaps of the webs in transit.

The longitudinal wedge faces the inside of the heat-sealing station 4 (in the case in point the separator 9 is at the top so that the longitudinal wedge points downwards) and is substantially as long as the separator 9, while the front wedge (if current) faces the station before the heat-sealing station (in this case it faces the preheating station 3) and extends only for the initial part of the sealing station 4.

The border of the longitudinal wedge of the separator 9 is parallel or nearly parallel to the advancing direction F of the webs, while the border of the front wedge is transversal to said direction.

The border of the longitudinal wedge is provided to interpose between the two flaps and to press them (in a vertical direction that is perpendicular to the advancing direction F of the webs 6) at or near the top margin of the operating zone of the heat-sealing half moulds 41, i.e. of the zone in which the half moulds 41 act on the material of the webs 6.

The separator 9 is capable to perform an approaching or distancing movement towards or away from the heat-sealing station 4 in direction K in both ways, to take up an active approaching position (FIG. 4), in which the longitudinal wedge presses both flaps of the webs to keep them separated (position taken up during the heat-sealing phase in which the half moulds are closed on the webs to be heat-sealed), and an inactive distancing position (FIG. 3), in which the longitudinal wedge is slightly retracted and does not press on the flaps although it remains inside the flaps (position taken up while the heat-sealing half moulds are open and the webs can advance forward along the feed line). The movement of the separator 9 is controlled by a usual axial fluid actuator 10 that operates to shift the separator 9 downwards, this could happen as soon as the half moulds 41 have been closed, and to keep it in position so as to exert preset downward pressure on the separated flaps during the heat-sealing phase.

In the closing position (FIG. 7) the forming half moulds 51 define a row of forming cavities in which the alveoli (previously obtained at the sealing station) are expanded. The forming station 5 is provided with a nozzles unit 8 for injecting a forming fluid. The nozzles unit 8 is prearranged to operate on the longitudinal opened and separated edges of the heat-sealed webs 6. The nozzles 8 are located in a row, substantially on the same plane (vertical in this case) as the facing webs being processed. The nozzles 8 are separated from one another by a step corresponding to the step of the containers in such a way that each nozzle is operationally associated with a corresponding forming cavity. The nozzles unit 8 is provided to be inserted between the two open and separated flaps of the webs, in a position corresponding to the alveoli made at the previous heat-sealing station. At the forming station 5 that is contiguous with and subsequent to the heat-sealing station 4, the action of the separator 9 ensures that the flaps are sufficiently separated to receive the nozzles 8 blowing the forming fluid. The nozzles 8 are on a single support body which is movable in a direction G that is perpendicular to the advancing direction F of the webs to insert and remove the nozzles into and from the open flaps of the webs. In the support body a channel is defined that can be connected with a source of the forming fluid and that feeds the nozzles.

The forming half moulds 51 have seats that are configured and arranged to house the nozzles 8 inserted between the respective flaps. When the half moulds (FIG. 7) are closed the seats press the flaps onto the nozzles 8. Closing the forming half moulds 51, also in asmuch as said seats close on the flaps of the webs and on the nozzles, creates a seal among the nozzles, the webs and the half moulds (FIG. 7), in particular during the phase of injection of the forming fluid, which causes thermoforming by expansion of the alveoli inside the forming cavities.

The thereby expanded alveoli become containers A arranged in a row on a continuous strip 12, which is indexed in an advancing direction F towards further processing.

During operation, after the webs 6 have been heated by passing through preheating stations 2 and 3 the advancing grippers advance by a step the webs 6 in such a way as to position the webs at the heat-sealing station. The advancing step is substantially equal to the length of a single operating station. The heat-sealing half moulds 41 are then closed, after which the separator 9 is shifted downwards so that the top open flaps of the webs 6 are kept separated with a given downward pressure during the heat-sealing phase during which the alveoli are made. The half moulds 41 then open and the webs go on by another step. The action of the separator 9 ensures that at the forming station 5 the top flaps of the webs 6 remain opened and well separated to enable the blowing nozzles 8 to be inserted.

Many different practical applicational modifications of constructional details may be applied to the invention without thereby leaving the scope of the invention that is claimed below.

The invention claimed is:

1. Forming apparatus for forming at least one continuous strip of containers, comprising:
   a feed line for indexing along a preset route in an advance direction two continuous portions of film material that face each other;
   one or more operating stations arranged along said preset route to transform said portions into at least one continuous strip of containers;
   wherein
   at least one of the operating stations is a heat-sealing station provided with two opposed operating elements between which said portions pass and which can reach a closed position in which said opposed operating elements heat-seal said portions together in preset zones to define alveoli, each of said alveoli being provided with at least one opening on an edge, said heat-sealing station having a length in said advance direction;
   said heat-sealing station comprises a movable separator having an end that can be inserted between two open longitudinal flaps of said portions, said separator extending along said advance direction by a length which does not exceed the length of said heat-sealing station;
   said separator is provided with a positioning device so configured as to move said separator transversely of said advance direction between an active position, in which said separator is moved against said flaps so as to press said flaps against said opposed operating elements, and an inactive position, in which said separator is moved away from said opposed operating elements while being kept between said flaps, so that said flaps can be slidably indexed in said advance direction;
   a forming station is provided downstream of said heat-sealing station, said forming station having a plurality of nozzles for injecting a forming fluid into said alveoli, the nozzles protruding from a support body movable in a direction perpendicular to said advance direction in order to insert said nozzles between, and move said nozzles away from, said flaps;
   the end of said separator is wedged-shaped and, in the closed position of the opposed operating elements of the heat-sealing station, said end presses said flaps without leaving any clearance against walls of a groove defined between said opposed operating elements, so that said flaps are thermoformed by said separator in an open configuration that allows said nozzles to be inserted between said flaps in said forming station.

2. Apparatus according to claim 1, wherein said end inserted between said flaps in said active position extends along at least most of the length of said heat-sealing station.

3. Apparatus according to claim 2, wherein said end inserted between said flaps substantially extends along the entire heat-sealing station.

4. Apparatus according to claim 1, wherein upstream of said heat-sealing station and contiguously with it, at least one preheating station is arranged to heat said portions before heat-sealing.

5. Apparatus according to claim 1, wherein said end inserted between said flaps comprises a corner that is prolonged along said heat-sealing station parallel to said advance direction of said portions.

6. Apparatus according to claim 1, wherein said positioning device for positioning said separator comprises an axial actuator acting transversely of said advance direction.

7. Forming apparatus for forming at least one continuous strip of containers, comprising:
- a feed line for indexing along a preset route in an advance direction two continuous portions of film material that face each other;
- a heat-sealing station provided with two opposed operating elements between which said portions pass and which is movable into a closed position in which said opposed operating elements heat-seal said portions together;
- a movable separator having an end that is insertable between two open longitudinal flaps of said portions, said separator being configured to move transversely of said advance direction between an active position, in which said separator is moved against said flaps so as to press said flaps against said opposed operating elements under the influence of pressure and/or heat to define an open configuration, and an inactive position, in which said separator is moved away from said opposed operating elements while being kept between said flaps, so that said flaps can be slidably indexed in said advance direction;
- a forming station provided downstream of said heat-sealing station, said forming station having at least one nozzle,
- wherein, in the closed position of the opposed operating elements of the heat-sealing station, said end of the separator presses said flaps against said opposed operating elements, so that said flaps stay opened in said open configuration when said nozzle is to be inserted between said flaps in said forming station.

8. The forming apparatus according to claim 7, wherein said open configuration has a generally V-shape which is generally maintained from the heat-sealing station to said forming station.

9. The forming apparatus according to claim 7, wherein the open configuration takes on the shape of the space between the end of the separator and the opposed operating elements, even when the operating elements are moved from said closed position to a separated position.

* * * * *